(12) United States Patent
Maher et al.

(10) Patent No.: US 11,159,856 B2
(45) Date of Patent: Oct. 26, 2021

(54) NON-LINEAR CONTENT PRESENTATION AND EXPERIENCE

(71) Applicant: Sony Interactive Entertainment LLC, San Mateo, CA (US)

(72) Inventors: Matt Maher, Novato, CA (US); Ripin Natani, South San Francisco, CA (US); Harshank Vengurlekar, Sunnyvale, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 15/645,377

(22) Filed: Jul. 10, 2017

(65) Prior Publication Data
US 2019/0014386 A1    Jan. 10, 2019

(51) Int. Cl.
*H04N 7/10* (2006.01)
*H04N 7/025* (2006.01)
(Continued)

(52) U.S. Cl.
CPC ......... *H04N 21/4882* (2013.01); *G06Q 30/02* (2013.01); *G06Q 50/01* (2013.01);
(Continued)

(58) Field of Classification Search
CPC ........... H04N 21/4882; H04N 21/2187; H04N 21/431; H04N 21/47214; H04N 21/84; H04L 65/608
(Continued)

(56) References Cited

U.S. PATENT DOCUMENTS 8,413,204 B2 * 4/2013 White ................ H04L 12/2809
725/133
8,719,347 B1    5/2014 Tomkins et al.
(Continued)

FOREIGN PATENT DOCUMENTS

CN    104756514    7/2015
JP    2009-503922    1/2009
(Continued)

OTHER PUBLICATIONS

U.S. Appl. No. 15/687,011 Office Action dated Apr. 19, 2018.
(Continued)

*Primary Examiner* — Nnenna N Ekpo
(74) *Attorney, Agent, or Firm* — Polsinelli LLP (57) ABSTRACT

Systems and methods for non-linear content presentation and experience are provided. A plurality of real-time streams of content may be received over a communication network. At least one of the streams may be provided in real-time to a user device to be played in real-time. At least one other stream may be evaluated in real-time to detect when an event occurs within the evaluated stream. The user device may be sent a notification when the event is detected in the evaluated stream. Such notification may be overlaid on a portion of the provided stream played at the user device. A request may be received from the user device concerning jumping to the detected event in the evaluated stream. The evaluated stream may then be provided to the user device at a point prior to the detected event.

23 Claims, 3 Drawing Sheets

(51) Int. Cl.

| | | |
|---|---|---|
| *H04N 21/488* | (2011.01) | |
| *H04N 21/431* | (2011.01) | |
| *H04L 29/06* | (2006.01) | |
| *H04N 21/84* | (2011.01) | |
| *H04N 21/472* | (2011.01) | |
| *H04N 21/2187* | (2011.01) | |
| *H04N 21/233* | (2011.01) | |
| *H04N 21/8549* | (2011.01) | |
| *G06Q 30/02* | (2012.01) | |
| *H04N 21/234* | (2011.01) | |
| *G06Q 50/00* | (2012.01) | |
| *H04N 21/845* | (2011.01) | |
| *H04N 21/4788* | (2011.01) | |

(52) U.S. Cl.
CPC ...... *H04L 65/1086* (2013.01); *H04L 65/4084* (2013.01); *H04L 65/608* (2013.01); *H04N 21/2187* (2013.01); *H04N 21/233* (2013.01); *H04N 21/23418* (2013.01); *H04N 21/431* (2013.01); *H04N 21/4788* (2013.01); *H04N 21/47214* (2013.01); *H04N 21/84* (2013.01); *H04N 21/8455* (2013.01); *H04N 21/8549* (2013.01)

(58) Field of Classification Search
USPC .......................................................... 725/32
See application file for complete search history.

(56) References Cited

U.S. PATENT DOCUMENTS

| | | | | |
|---|---|---|---|---|
| 8,745,206 | B1* | 6/2014 | Chang .................... | H04L 67/22 709/223 |
| 9,021,517 | B2* | 4/2015 | Selim .................... | G06F 3/017 725/16 |
| 9,332,300 | B2* | 5/2016 | Jung .................... | H04N 21/431 |
| 9,473,819 | B1* | 10/2016 | Bostick ............ | H04N 21/44222 |
| 9,736,503 | B1* | 8/2017 | Bakshi ............. | H04N 21/23424 |
| 9,854,317 | B1* | 12/2017 | Abboa-Offei ...... | H04N 21/4788 |
| 9,904,703 | B1* | 2/2018 | Haugen ................ | G06F 16/245 |
| 10,405,017 | B1 | 9/2019 | Roka | |
| 10,728,622 | B2 | 7/2020 | Maher | |
| 2002/0075402 | A1* | 6/2002 | Robson ................ | H04N 21/262 348/460 |
| 2002/0124252 | A1* | 9/2002 | Schaefer ............ | H04N 7/17318 725/33 |
| 2002/0166123 | A1* | 11/2002 | Schrader ............ | H04N 21/8543 725/58 |
| 2003/0018967 | A1 | 1/2003 | Gorbatov et al. | |
| 2003/0142238 | A1 | 7/2003 | Wasack et al. | |
| 2005/0015803 | A1 | 1/2005 | Macrae et al. | |
| 2009/0133069 | A1* | 5/2009 | Conness ............ | H04N 5/44543 725/46 |
| 2009/0293079 | A1 | 11/2009 | McKee | |
| 2010/0125891 | A1* | 5/2010 | Baskaran ............ | G06F 21/6218 726/1 |
| 2010/0175088 | A1* | 7/2010 | Loebig .................. | G11B 27/34 725/40 |
| 2011/0035462 | A1 | 2/2011 | Akella | |
| 2012/0174157 | A1 | 7/2012 | Stinson et al. | |
| 2012/0202587 | A1* | 8/2012 | Allen .................. | G07F 17/3223 463/25 |
| 2012/0284752 | A1 | 11/2012 | Jung | |
| 2013/0125181 | A1* | 5/2013 | Montemayor ... | H04N 21/25825 725/93 |
| 2013/0263185 | A1 | 10/2013 | Wood et al. | |
| 2013/0297688 | A1 | 11/2013 | Zheng | |
| 2014/0089953 | A1 | 3/2014 | Chen et al. | |
| 2014/0325556 | A1 | 10/2014 | Hoang et al. | |
| 2015/0020127 | A1 | 1/2015 | Doshi et al. | |
| 2015/0082330 | A1* | 3/2015 | Yun ...................... | H04N 21/233 725/14 |
| 2015/0113013 | A1* | 4/2015 | Rys .......................... | G06F 16/24 707/758 |
| 2015/0288997 | A1 | 10/2015 | Basra | |
| 2015/0382062 | A1 | 12/2015 | Sivaraman | |
| 2016/0213995 | A1 | 7/2016 | Huebsch | |
| 2016/0277813 | A1* | 9/2016 | Pizzo ................. | H04N 21/8586 |
| 2016/0286244 | A1 | 9/2016 | Chang et al. | |
| 2017/0006322 | A1 | 1/2017 | Dury et al. | |
| 2017/0070783 | A1 | 3/2017 | Printz et al. | |
| 2017/0085941 | A1 | 3/2017 | Gupta et al. | |
| 2017/0127091 | A1 | 5/2017 | Bostick et al. | |
| 2017/0149704 | A1 | 5/2017 | Batiz et al. | |
| 2017/0230709 | A1 | 8/2017 | Van Os et al. | |
| 2017/0257654 | A1* | 9/2017 | Branch ................ | H04N 21/252 |
| 2017/0374402 | A1 | 12/2017 | Pogorelik et al. | |
| 2018/0098123 | A1 | 4/2018 | Larson et al. | |
| 2019/0069031 | A1 | 2/2019 | Maher | |
| 2020/0359098 | A1 | 11/2020 | Maher | |

FOREIGN PATENT DOCUMENTS

| | | |
|---|---|---|
| JP | 2013-218501 | 10/2013 |
| JP | 2014-052972 | 3/2014 |
| JP | 2020-527896 | 9/2020 |
| WO | WO 2014/036362 | 3/2014 |
| WO | WO 2016/033545 | 3/2016 |
| WO | WO 2017/023763 | 2/2017 |
| WO | WO 2017/053532 | 3/2017 |
| WO | WO 2019/013874 | 1/2019 |
| WO | WO 2019/040275 | 2/2019 |

OTHER PUBLICATIONS

U.S. Appl. No. 15/687,011 Office Action dated Feb. 21, 2019.
PCT/US18/34368, Non-Linear Presentation and Experience, May 24, 2018.
U.S. Appl. No. 15/687,011, Matt Maher, Management of Non-Linear Content Presentation and Experience, filed Aug. 25, 2017.
U.S. Appl. No. 15/687,011, Matt Maher, Management of Non-Linear Presentation and Experience, filed Aug. 25, 2017.
U.S. Appl. No. 15/687,011 Final Office Action dated Oct. 22, 2018.
U.S. Appl. No. 15/687,011 Final Office Action dated Aug. 13, 2019.
PCT Application No. PCT/US2018/034368 International Preliminary Report On Patentability dated Jan. 14, 2020.
PCT Application No. PCT/US2018/045627 International Preliminary Report On Patentability dated Feb. 25, 2020.
EP Application No. 18832211.9 EP Extended Search Report dated Oct. 25, 2020.
EP Application No. 18848743.3 EP Extended Search Report dated Nov. 13, 2020.
JP Application No. 2020-508324 Notification of Reasons for Refusal dated Apr. 20, 2021.
PCT Application No. PCT/US2018/034368 International Search Report and Written Opinion dated Jun. 25, 2018.
U.S. Appl. No. 16/941,353, Matt Maher, Management of Non-Linear Content Presentation and Experience, filed Jul. 28, 2020.
CN Application No. 201880054062.7 First Office Action dated May 26, 2021.
JP Application No. 2020-501335 Notification of Reasons for Refusal dated May 25, 2021.

* cited by examiner

NON-LINEAR CONTENT PRESENTATION AND EXPERIENCE

BACKGROUND

1. Field of the Invention

The present technology pertains to content presentation, and more specifically to non-linear content presentation and experience.

2. Description of the Related Art

Presently available ways to consume content generally occur in a linear fashion. Such linear content consumption may include watching content as it is played on a user device screen. Certain pre-recorded content (e.g., DVD) may allow for jumping to certain chapters. While such chapters may be associated with a summary, the start of each chapter may be generally based on predefined time durations rather than the occurrence of events. While certain options are available to rewind or fast-forward, there is currently no way to jump to a specified event that occurred within the content.

An event may be any displayed or played within the content stream that may be of significance. For example, certain scoring events may be significant to a sporting competition, especially if performed in particularly acrobatic, lucky, or otherwise impressive, interesting, or unusual fashion. During live presentations, such events may be unpredictable and occur at unexpected times. A user or viewer may nonetheless desire to watch such event as soon as possible, particularly if the event is critical to the eventual outcome of the competition.

Such lack is further exacerbated with real-time content, such as a broadcast of a sporting event taking place in real-time. Many sporting events are played at least partially concurrently. For example, multiple NFL football games are played on any given Sunday during the football season. It may therefore be difficult for a user to watch each game in real-time without a plurality of screens. Users who are interested in multiple concurrent games may therefore have to record one or more games to watch later. Such recording and subsequent watching does not allow the user to experience the event as soon as (or soon after) it happened so as to be able to participate in near real-time discussion and interaction related to the event.

There is, therefore, a need in the art for systems and methods of non-linear content presentation and experience.

SUMMARY OF THE PRESENTLY CLAIMED INVENTION

Embodiments of the present invention include non-linear content presentation and experience. A plurality of real-time streams of content may be received over a communication network. At least one of the streams may be provided in real-time to a user device to be played in real-time. At least one other stream may be evaluated in real-time to detect when an event occurs within the evaluated stream. The user device may be sent a notification when the event is detected in the evaluated stream. Such notification may be overlaid on a portion of the provided stream played at the user device. A request may be received from the user device concerning jumping to the detected event in the evaluated stream. The evaluated stream may then be provided to the user device at a point prior to the detected event.

Various embodiments may include systems for non-linear content presentation and experience. Such systems may include a communication interface that communicates over a communication network to receive a plurality of real-time streams of content sent over a communication network to provide. at least one of the streams to a user device that plays the provided stream in real-time. Such systems may further include a processor that executes instructions to evaluate at least one other stream in real-time to detect when an event occurs within the evaluated stream. The communication interface may then send the user device a notification when the event is detected in the evaluated stream. The notification may be overlaid on a portion of the provided stream played at the user device, which may request to jump to the detected event in the evaluated stream. The communication interface may then provide the evaluated stream to the user device at a point prior to the detected event.

Additional embodiments may include methods for non-linear content presentation and experience. Such methods may include receiving a plurality of real-time streams of content sent over a communication network, providing at least one of the streams to a user device to play real-time, evaluating at least one other stream in real-time to detect when an event occurs within the evaluated stream, sending the user device a notification when the event is detected in the evaluated stream where the notification is overlaid on a portion of the provided stream played at the user device, receiving a request from the user device concerning jumping to the detected event in the evaluated stream, providing the evaluated stream to the user device at a point prior to the detected event.

Further embodiments include non-transitory computer-readable storage media having embodied thereon a program executable by a processor to perform a method for non-linear content presentation and experience as described above.

DETAILED DESCRIPTION

Embodiments of the present invention include non-linear content presentation and experience. A plurality of real-time streams of content may be received over a communication network. At least one of the streams may be provided in real-time to a user device to be played in real-time. At least one other stream may be evaluated in real-time to detect when an event occurs within the evaluated stream. The user device may be sent a notification when the event is detected in the evaluated stream. Such notification may be overlaid on a portion of the provided stream played at the user device. A request may be received from the user device concerning jumping to the detected event in the evaluated stream. The evaluated stream may then be provided to the user device at a point prior to the detected event.

Figure 1:
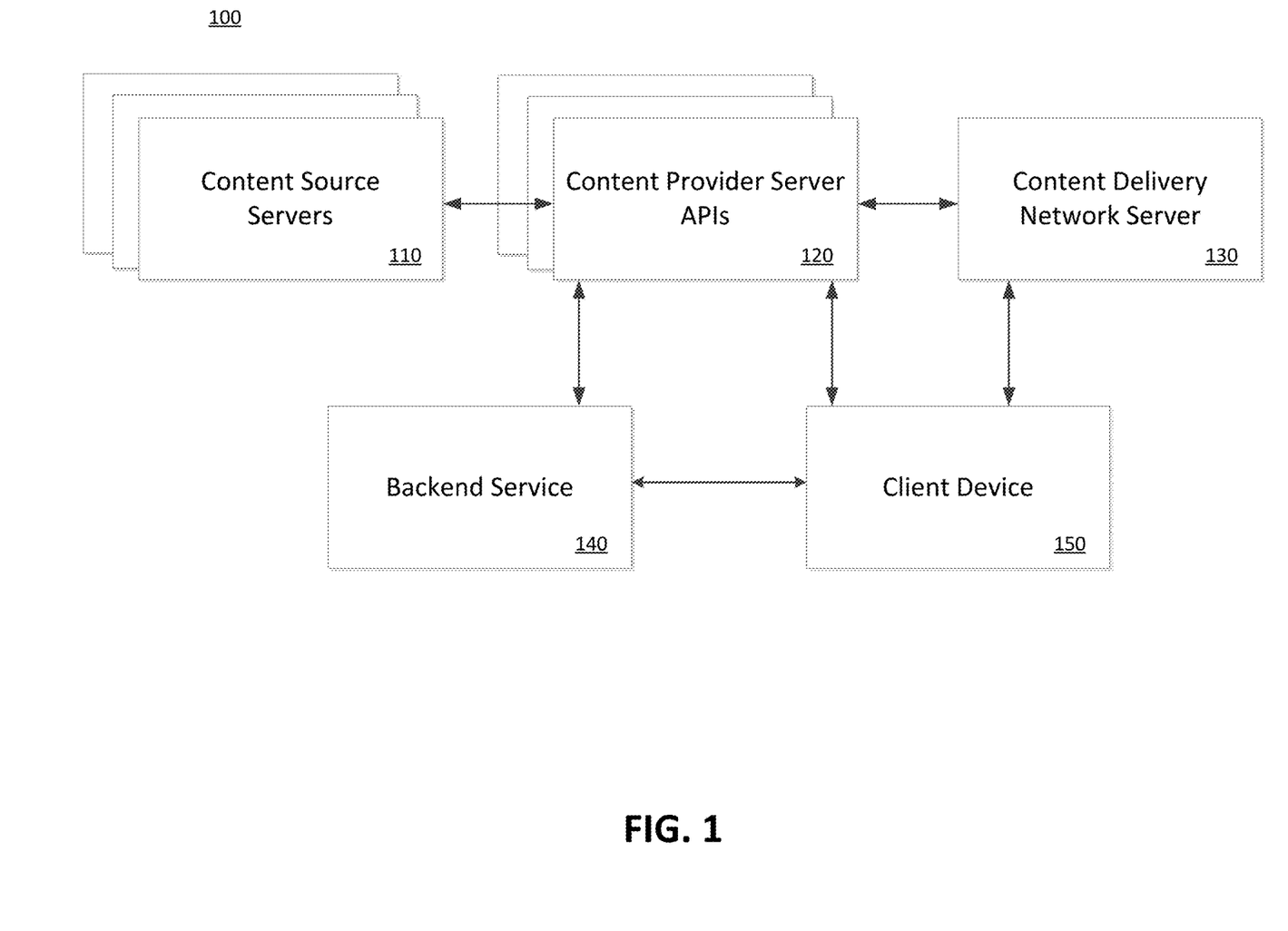
FIG. 1 illustrates a network environment in which a system for non-linear content presentation and experience may be implemented.

FIG. 1 illustrates a network environment 100 in which a system for non-linear content presentation and experience may be implemented. The network environment 100 may include one or more content source servers 110 that provide streaming content (e.g., video) for distribution (e.g., via one or more video on-demand (VOD) services), one or more content provider server application program interfaces (APIs) 120, content delivery network server 130, a backend service layer 140, and one or more client devices 150.

Content source servers 110 may maintain and provide media titles available for streaming. Such media titles may include not only pre-recorded content (e.g., DVR content), but also streams of live broadcasts (e.g., live sporting events, live e-sporting events, broadcast premieres). The content source servers 110 may be associated with any content provider that makes its content available to be streamed The streaming content from content source server 110 may be provided through a content provider server API 120, which allows various types of content sources server 110 to communicate with backend service layer 140. The content provider server API 120 may be specific to the particular language, operating system, protocols, etc. of the content source server 110 providing the streaming content. In a network environment 100 that includes multiple different types of content source servers 110, there may likewise be a corresponding number of content provider server APIs 120.

The content provider server API 120 therefore facilitates access of each of the client devices 150 to the content hosted by the content source servers 110. Additional information, such as metadata, about the accessed content can also be provided by the content provider server API 120 to the client device 150. As described below, the additional information (i.e. metadata) can be usable to provide details about the content being streamed to the client device 150. Finally, additional services associated with the accessed content such as chat services, ratings and profiles can also be provided from the content source servers 110 to the client device 150 via the content provider server API 120.

The content provider server API 120 can be accessed by a content delivery network server 130. The content delivery network server 130 may include a server that provides resources and files related to the streaming media, including promotional images and service configurations with client devices 150. The content delivery network server 130 can also be called upon by the client devices 150 that request to stream or subscribe to specific content.

The content provider server API 120 may be accessed by a backend service layer 140 in order to obtain information about available streaming content for the client device 150. As described below, the additional information about the content may include metadata describing the available content (e.g., by author, title, genre). The information may also include a location where the content is stored (e.g., URL) so that the user device can proceed with retrieving the content from the content source server 110. Furthermore, the (e.g., author, title, genre) 120 may include instructions for implementing functionalities (e.g., chat) that would allow different client devices 150 to interact with each other. Such instructions may be used by the backend service layer 140 to provide certain functionalities to the client device 150.

The backend service layer 140 may be responsible for communicating with the different content source servers 110 in order to provide that content to the client device 150. The backend service layer 140 may carry out instructions, for example, for identifying the format of a media title and formatting the media title so as to be playable on the client device 150. Such formatting may include identifying the metadata associated with each of the content then using various different types of conversion techniques so that data stored in one format at the content source servers 110 may be rendered and displayed on the client devices 150, which may require a different format. As such, media titles of different formats may be provided to and made compatible with client device 150 via the backend service layer 140.

'The client device 150 may include a plurality of different types of computing devices. For example, the client device 150 may include any number of different gaming consoles, mobile devices, laptops, and desktops. Such client devices 150 may also be configured to access data from other storage media, such as, but not limited to memory cards or disk drives as may be appropriate in the case of downloaded services. Such devices 150 may include standard hardware computing components such as, but not limited to network and media interfaces, non-transitory computer-readable storage (memory), and processors for executing instructions that may be stored in memory. These client devices 150 may also run using a variety of different operating systems (e.g., iOS, Android), applications or computing languages (e.g., C++, JavaScript). An exemplary client device 150 is described in detail herein with respect to FIG. 3.

In an exemplary implementation of non-linear content presentation and experience, content source servers 110 may provide real-time streams (e.g., different live sporting competitions) through content provider server APIs 120 to backend service layer 140 and to client device 150, which may play one of the streams. In the meantime, backend service layer 140 may be evaluating the other streams in real-time to detect events (e.g., touchdown or other type of scoring event) as they occur within their respective streams.

Detection of such event may be based on a variety of factors. Some factors may be directly derived from analysis of the content stream itself. For example, certain visual or audio parameters may be detected. Visual cues for a sporting competition may include score changes (especially where the score change results in a lead change), time on the clock, replays by the broadcaster, etc., individually or in combination with other factors. Analysis of such visual cues may therefore involve image analysis to recognize characters and numbers, video analysis, and comparison with previous images and video.

Audio analysis may include analyzing the sounds of an audience (e.g., cheers, jeers, sudden silences) or commentary by commentators. Such commentators may be part of the content stream being evaluated, or the commentary may be from another stream that may be associated with the evaluated stream. Audio analysis may therefore involve not only identifying the content of what is being said, but various parameters of the same, including timing, tone, volume, and changes to the same.

Natural language processing may therefore be applied to such audio factors, as well as to written content associated with the evaluated stream. Such written content may include microblogs and social media feeds associated with the evaluated stream. Such association may be identified based on hashtags, keywords, specified accounts/pages, social connections/followers, etc. Natural language processing may be used to derive the meaning of the content being generated and what such meaning indicates about the evaluated stream.

In association with natural language processing, sentiment analysis may be applied to any of the foregoing parameters. For example, analysis of the crowd noise, commentary by commentators, social media posts, related hashtags, etc. may be analyzed to identify reactions to a significant event. Such sentiment analysis can detect spikes in activity, as well as characterize the type of activity. For example, social media posts by fans of one sports team may indicate a sharp increase in happiness and excitement (and conversely, the fans of the competing sports team may show signs of disappointment and anger at the same time).

Social factors may also be considered in a manner so as to identify events that may be most relevant to a particular user. For example, the user device may be associated with a number of other devices that have been designated as "friend" devices. The activity of the friend devices may indicate an event of interest where such activity may include replays of a certain section of a content stream, pausing or slow-motion replay of certain section, screenshots taken of a certain section, chat activity, and other activity indicative of interest. Similarly, the social media accounts associated with the user of the user device may be used to identify events of interest.

Other information related to the evaluated stream may also be considered in identifying whether a significant event has occurred. Certain third party service providers may provide a data stream analyzing metadata related to the content stream (e.g. of a sports competition, television show, awards show). Such metadata may indicate excitement factors (including increases and decreases in the same).

When such an event is detected, a bookmark may be created and associated with a specified point within the evaluated stream. Such point may be a predefined (e.g., 5-10 seconds) time duration prior to the detected event. The bookmark may mark a place within the stream where a user device may jump directly to view the detected event. Where a particular stream may include multiple events, that stream may be associated with a corresponding number of bookmarks. Whereas the bookmark may mark the beginning of an event, the end of the event may likewise be detected through similar analytical approaches discussed above (e.g., decrease in excitement, lower activity in social media, etc.). In some embodiments, the bookmarks may further be associated with a short summary based on the evaluation. Such summary may be based on related hashtags, social media posts (e.g., those with particularly high number of reposts by others), or other results of the detection methods discussed above.

In addition, a notification may be sent by backend service layer 140 to client device 150 to be overlaid on a portion of the playing content. If the user device is not on, the notification may appear when the user device (or an associated screen) is switched on. In some embodiments, the notification may be pushed to one or more devices associated with a specified user, including mobile phone, tablet, computing device, television console, other entertainment console, etc. The particular devices may be specified based on user preference, as well as the types of streams, significance of events, or prioritization level of the events for which the user wishes to be notified.

In some embodiments, the notification may be associated with a menu of a plurality of different events deemed to be of significance or likely relevance to the viewer's interests. The events may be associated with the same or different streams of content. One option that may be selected in the menu may include a highlight reel of all events for a particular stream (e.g., a specified sporting competition). Such a highlight reel may include, for example, all touchdowns, field goals, sacks, and interceptions for an NFL football game. Such a highlight reel may be generated automatically based on the bookmarks indicating the start and end of each detected event within the evaluated content stream. In some embodiments, the highlight reels may further be customized to the requesting viewer based on significance or relevance as indicated by social or other user-specific factors.

Moreover, the highlight reel may be associated with the content stream if and when the content stream is made available for on-demand streaming at a later point in time. A user or viewer may therefore opt to catch up on the events of the content stream (e.g., that had been deemed significant based on evaluation) without having to sit through the entire linear playtime of the stream. In that regard, a viewer who wishes to catch up on a long-running episodic series may not be required to watch each and every episode of the series in linear fashion from beginning to end. Rather, such viewer may watch a highlight reel of just those events deemed significant by the evaluation methods discussed herein. Certain events may be prioritized based on significance and relevance to the viewer as well, such that different sets of events may be characterized and selected by the viewer or for inclusion in the highlight reels.

Further, a user may opt to rewatch a certain event multiple times in light of later occurrences. For example, a viewer of a television series with multiple episodes may realize while watching a later episode that a particular event in a past episode had a different significance than they originally thought. That viewer may elect to jump directly back to the event for rewatching purposes.

A user of the client device 150 may opt to jump to another stream based on the notification that such an event occurred. When such a request to make such a jump is received by backend service layer 140, the stream being provided to the client device 150 may switch to the stream with the detected event at a point just prior to the event. As such, the user device may experience events occurring across multiple streams shortly after each event's occurrence, as well as skipping time periods within the stream in which no events are detected.

Figure 2:
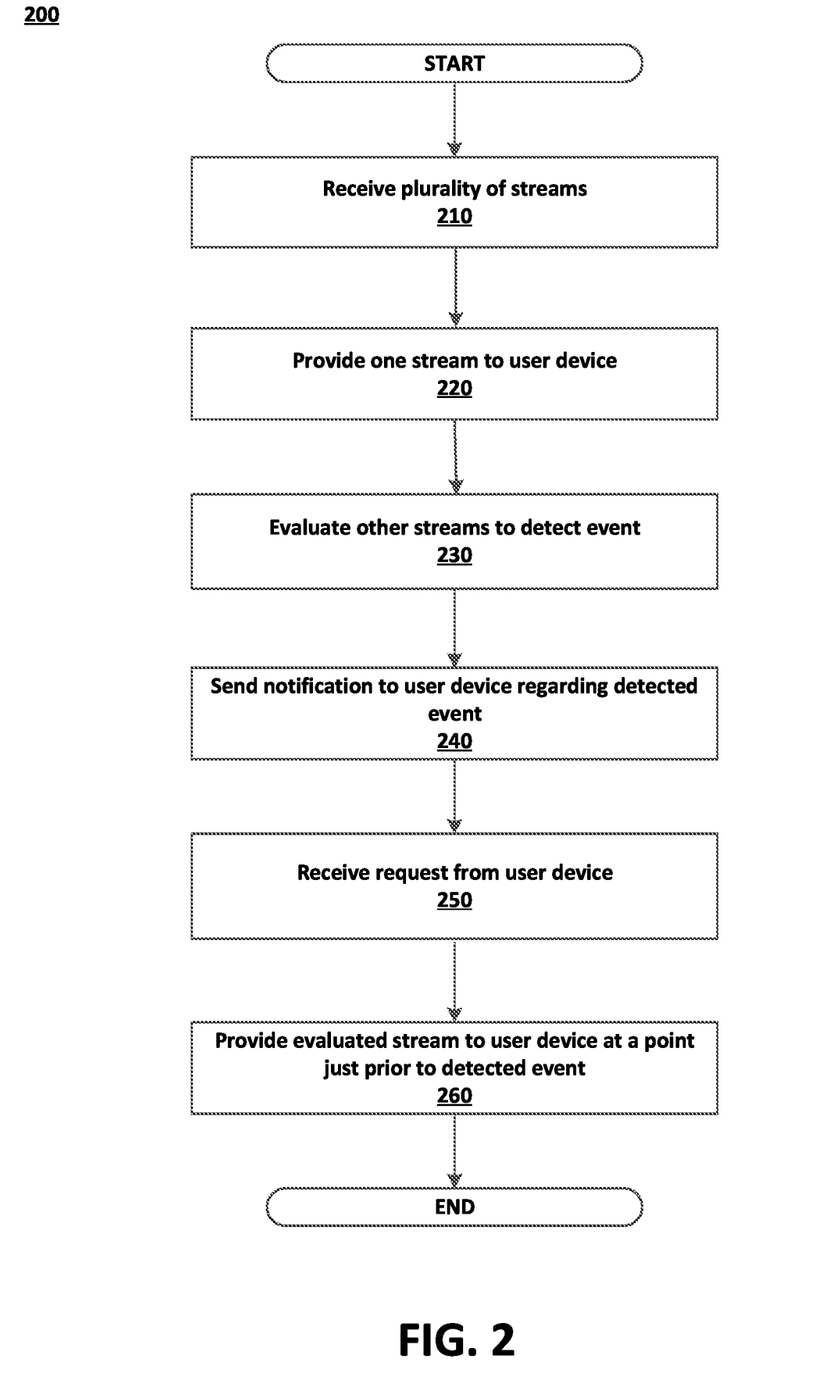
FIG. 2 is a flowchart illustrating an exemplary method for non-linear content presentation and experience.

FIG. 2 is a flowchart illustrating an exemplary method 200 for non-linear content presentation and experience. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200, a plurality of real-time streams may be received, one of the streams may be provided to the user device in real-time, at least one other stream may be evaluated to detect an event in real-time, a notification may be sent to the user device regarding the detected event, and the evaluated stream may be provided to the user device at a point just prior to the detected event.

In step 210, a plurality of real-time streams may be received at backend service layer 140. Such real-time streams may include streams of live presentations (e.g., sporting competitions, concerts, awards shows, original television broadcasts). In step 220, one stream may be provided in real-time for play at client device 150. In some embodiments, the client device 150 may simply be off, sleeping/hibernating or otherwise inactive, or playing other content (including recorded or on-demand content).

In step 230, the streams may be evaluated in real-time by backend service layer 140 to detect an event. Detection of the event may be based on identifying visual or audio events within the stream. For example, visual changes to the scoreboard or audio changes when a sporting crowd cheers or boos may be detectable. Detection of events may be based on evaluation of traffic in social media feeds or hashtags associated with the stream. Such social media feeds may also be prioritized based on defined "friends" of the user of the client device 150. Such evaluation of social media may include natural language processing and sentiment analysis to identify excitement or other reaction among a population experiencing the evaluated stream. In other embodiments, the evaluation may include tracking activity at another user device designated as a "friend" of client device 150. Such activity may include replay requests or screenshots taken. Evaluation may further be based on metadata associated with the stream. Such metadata may or may not be part of the actual stream. For example, a third party may provide the metadata regarding the evaluated stream.

In some embodiments, a bookmark may be generated to mark a point within the evaluated stream just prior to the detected event (e.g., by a predefined time period). As such, jumping to the bookmark allows a user to view the detected event starting from a few seconds prior to establish the context in which the event occurred. The bookmark may be used not only to take the user directly to the event, but as a basis for generating highlight reels.

In step 240, a notification may be sent to the client device 150 regarding the detected event. When the client device 150 is already playing other content, such notification may be overlaid over a portion of a screen associated with the client device 150. As such, the client device 150 may be watching one stream in real-time but be able to see the notification as well. Alternatively, where the client device 150 may be inactive, the notification may be provided when the client device 150 is activated. In some cases, the notification, the notification may also be pushed to other devices associated with the user.

In step 250, a request may be received from the client device 150. Such request may concern a desire to see the detected event (e.g., jump directly to a point in the evaluated stream from which a user may view the detected event). Such request may be made from a link within the notification, within a menu of events, or as part of a request for a highlight reel that may begin with the detected event.

In step 260, the evaluated stream may be provided to the client device 150 at a point just prior to the detected event (e.g., as marked by a bookmark). The point may be a predefined time period prior to the detected event so as to allow the user to view the event in context.

In some embodiments, the stream may be recorded and provided for later consumption. During the later consumption, a collection of multiple bookmarks may be presented to a playing client device 150. Each bookmark may therefore mark different detected events within the stream. The stream may further be associated with a highlight reel of the detected events. As such, the duration of each event may be determined, and a video clip of the event may be generated by clipping the stream at the bookmark(s) marking the determined duration.

Figure 3:
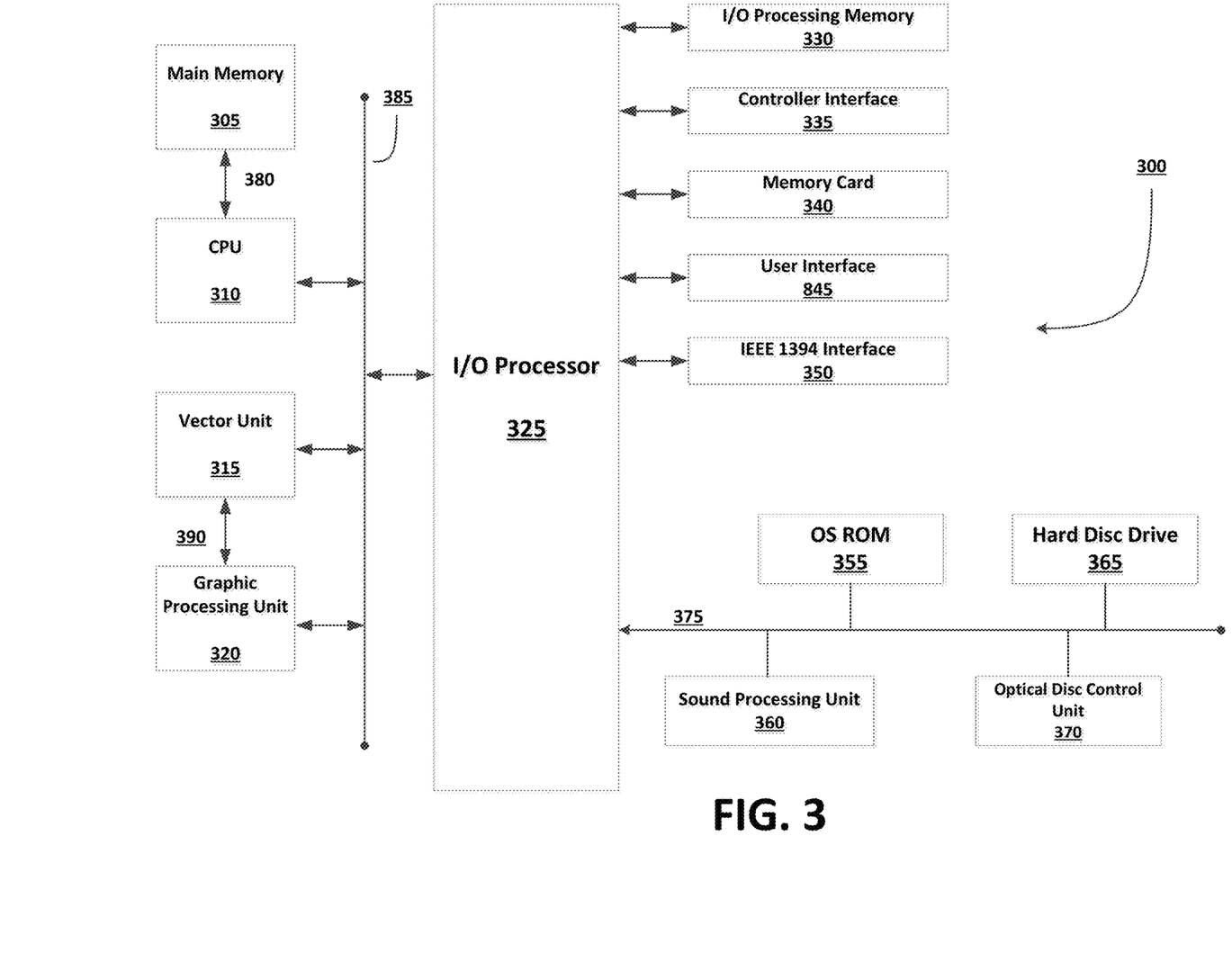
FIG. 3 is an exemplary electronic entertainment system that may be used in non-linear content presentation and experience.

FIG. 3 is an exemplary electronic entertainment system that may be used in real-time incorporation of user-produced media into a broadcast media stream. The entertainment system 300 of FIG. 3 includes a main memory 305, a central processing unit (CPU) 310, vector unit 315, a graphics processing unit 320, an input/output (I/O) processor 325, an I/O processor memory 330, a controller interface 335, a memory card 340, a Universal Serial Bus (USB) interface 345, and an IEEE 1394 interface 350. The entertainment system 300 further includes an operating system read-only memory (OS ROM) 355, a sound processing unit 360, an optical disc control unit 370, and a hard disc drive 365, which are connected via a bus 375 to the I/O processor 325.

Entertainment system 300 may be an electronic game console. Alternatively, the entertainment system 300 may be implemented as a general-purpose computer, a set-top box, a hand-held game device, a tablet computing device, or a mobile computing device or phone. Entertainment systems may contain more or less operating components depending on a particular form factor, purpose, or design.

The CPU 310, the vector unit 315, the graphics processing unit 320, and the I/O processor 325 of FIG. 3 communicate via a system bus 385. Further, the CPU 310 of FIG. 3 communicates with the main memory 305 via a dedicated bus 380, while the vector unit 315 and the graphics processing unit 320 may communicate through a dedicated bus 390. The CPU 310 of FIG. 3 executes programs stored in the OS ROM 355 and the main memory 305. The main memory 305 of FIG. 3 may contain pre-stored programs and programs transferred through the I/O Processor 325 from a CD-ROM, DVD-ROM, or other optical disc (not shown) using the optical disc control unit 370. I/O Processor 325 of FIG. 3 may also allow for the introduction of content transferred over a wireless or other communications network (e.g., 4G, LTE, 1G, and so forth). The I/O processor 325 of FIG. 3 primarily controls data exchanges between the various devices of the entertainment system 300 including the CPU 310, the vector unit 315, the graphics processing unit 320, and the controller interface 335.

The graphics processing unit 320 of FIG. 3 executes graphics instructions received from the CPU 310 and the vector unit 315 to produce images for display on a display device (not shown). For example, the vector unit 315 of FIG. 3 may transform objects from three-dimensional coordinates to two-dimensional coordinates, and send the two-dimensional coordinates to the graphics processing unit 320. Furthermore, the sound processing unit 360 executes instructions to produce sound signals that are outputted to an audio device such as speakers (not shown). Other devices may be connected to the entertainment system 300 via the USB interface 345, and the IEEE 1394 interface 350 such as wireless transceivers, which may also be embedded in the system 300 or as a part of some other component such as a processor.

A user of the entertainment system 300 of FIG. 3 provides instructions via the controller interface 335 to the CPU 310. For example, the user may instruct the CPU 310 to store certain game information on the memory card 340 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for non-linear content presentation and experience, the system comprising:
    a communication interface that communicates over a communication network, wherein the communication interface:
        receives a plurality of real-time streams of content sent over the communication network, and
        provides at least one of the streams to a user device in real-time, wherein the user device plays the at least one stream; and
    a processor that executes instructions stored in memory, wherein execution of the instructions by the processor evaluates at least one other stream from the received plurality of real-time streams in real-time while the user device is playing the at least one stream, wherein evaluating the at least one other stream comprises:
        tracking activity engaged in by one or more predefined friend devices associated with the user device and that are streaming the at least one other stream, wherein the tracked activity includes chat activity related to the at least one other stream and indicates a spike at a specified point within the at least one stream,
        identifying an event within the at least one other stream as relevant to a user of the user device based on the spike, the event identified at the same specified point within the at least one other stream as the spike, and
        generating a bookmark to associate with the identified event, the bookmark set at a point prior to the identified event, wherein the point is a predefined time period prior to the identified event;
    wherein the communication interface is further:
        sending the user device a notification regarding the event identified in the at least one other stream, the notification including different display options for displaying the identified event, wherein the notification is overlaid on a portion of the provided stream currently being played at the user device,
        receiving a request from the user device, wherein the request concerns jumping to the identified event in the at least one other stream, and
        providing the at least one other stream to the user device at the point within the stream that is the predefined time period prior to the identified event based on the request by jumping to the bookmark, wherein the predefined time period corresponds to a portion of the at least one other stream prior to occurrence of the identified event, and wherein display of the portion establishes a context preceding the occurrence of the identified event.

2. The system of claim 1, wherein the processor executes further instructions to generate an overlay comprising a plurality of bookmarks, wherein each bookmark is selectable to jump to a different identified event within the at least one other stream.

3. The system of claim 1, wherein the processor executes further instructions to generate a highlight reel for the at least one other stream, wherein the highlight reel comprises a plurality of identified events.

4. The system of 3, wherein the processor generates the highlight reel by identifying a duration of the identified event and clipping the at least one other stream at the bookmark for the identified duration.

5. The system of claim 1, wherein the processor executes further instructions to evaluate the at least one other stream in real-time by identifying a change in a score associated with the at least one other stream.

6. The system of claim 1, wherein the processor executes further instructions to evaluate the at least one other stream in real-time by tracking traffic in one or more social media feeds identified as associated with the at least one other stream.

7. The system of claim 6, wherein the processor executes further instructions to track traffic in the one or more social media feeds by performing natural language processing and sentiment analysis.

8. The system of claim 1, wherein the processor executes further instructions to evaluate the at least one other stream in real-time by evaluating metadata associated with the at least one other stream.

9. The system of claim 8, wherein the communication interface further receives the metadata separately from the at least one other stream.

10. A method for non-linear content presentation and experience, the method comprising:
    receiving a plurality of real-time streams of content sent over a communication network;
    providing at least one of the streams to a user device in real-time, wherein the user device plays the at least one stream;
    evaluating at least one other stream from the received plurality of real-time streams in real-time while the user device is playing the at least one stream, wherein evaluating the at least one other stream comprises:
        tracking activity engaged in by one or more predefined friend devices associated with the user device and that are streaming the at least one other stream, wherein the tracked activity includes chat activity related to the at least one other stream and indicates a spike at a specified point within the at least one stream,
        identifying an event within the at least one other stream as relevant to a user of the user device based on the spike, the event identified at the same specified point within the at least one other stream as the spike, and generating a bookmark to associate with the identified event, the bookmark set at a point prior to the identified event, wherein the point is a predefined time period prior to the identified event;

sending the user device a notification regarding the event identified in the at least one other stream, the notification including different display options for displaying the identified event, wherein the notification is overlaid on a portion of the provided stream currently being played at the user device;

receiving a request from the user device, wherein the request concerns jumping to the identified event in the at least one other stream; and providing the at least one other stream to the user device at the point within the stream that is the predefined time period prior to the identified event based on the request by jumping to the bookmark, wherein the predefined time period corresponds to a portion of the at least one other stream prior to occurrence of the identified event, and wherein display of the portion establishes a context preceding the occurrence of the identified event.

11. The method of claim 10, further comprising generating an overlay comprising a plurality of bookmarks, wherein each bookmark is selectable to jump to a different identified event within the at least one other stream.

12. The method of claim 10, further comprising generating a highlight reel for the at least one other stream, wherein the highlight reel comprises a plurality of identified events.

13. The method of claim 12, wherein generating the highlight reel by identifying a duration of the identified event and clipping the at least one other stream at the bookmark for the identified duration.

14. The method of claim 10, wherein evaluating the at least one other stream in real-time comprises identifying a change in a score associated with the at least one other stream.

15. The method of claim 10, wherein evaluating the at least one other stream in real-time comprises tracking traffic in one or more social media feeds identified as associated with the at least one other stream.

16. The method of claim 15, wherein tracking the traffic in the one or more social media feeds further comprises performing natural language processing and sentiment analysis.

17. The method of claim 10, wherein evaluating the at least one other stream in real-time comprises evaluating metadata associated with the at least one other stream.

18. The method of claim 17, further comprising receiving the metadata separately from the at least one other stream.

19. A non-transitory computer-readable medium having embodied thereon a program executable by a processor to perform a method for non-linear content presentation and experience, the method comprising:

receiving a plurality of real-time streams of content sent over a communication network;

providing at least one of the streams to a user device in real-time, wherein the user device plays the at least one stream;

evaluating at least one other stream from the received plurality of real-time streams in real-time while the user device is playing the at least one stream, wherein evaluating the at least one other stream comprises:

tracking activity engaged in by one or more predefined friend devices associated with the user device and that are streaming the at least one other stream, wherein the tracked activity includes chat activity related to the at least one other stream and including a spike occurring at a specified point within the at least one stream, identifying an event within the at least one other stream as relevant to a user of the user device based on the spike, the event identified at the same specified point within the at least one other stream as the spike, and generating a bookmark to associate with the identified event, the bookmark set at a point prior to the identified event, wherein the point is a predefined time period prior to the identified event;

sending the user device a notification regarding the event identified in the at least one other stream, the notification including different display options for displaying the identified event, wherein the notification is overlaid on a portion of the provided stream currently being played at the user device;

receiving a request from the user device, wherein the request concerns jumping to the identified event in the at least one other stream; and providing the at least one other stream to the user device at the point within the stream that is the predefined time period prior to the identified event based on the request by jumping to the bookmark, wherein the predefined time period corresponds to a portion of the at least one other stream prior to occurrence of the identified event, and wherein display of the portion establishes a context preceding the occurrence of the identified event.

20. The system of claim 1, wherein the tracked activity further includes replay requests at the one or more predefined friend devices during play of the at least one other stream.

21. The system of claim 1, wherein the tracked activity further includes screenshots taken at the one or more predefined friend devices during play of the at least one other stream.

22. The system of claim 1, wherein providing the at least one other stream includes skipping one or more time periods prior to the point within the stream that is the predefined time period prior to the identified event.

23. The system of claim 1, wherein providing the at least one other stream includes switching to another stream after an end of the identified event.

* * * * *